United States Patent [19]

Owen

[11] Patent Number: 5,005,100
[45] Date of Patent: Apr. 2, 1991

[54] TRANSIENT-FILTERED TRANSFORMER

[75] Inventor: Donald W. Owen, Yukon, Okla.

[73] Assignee: Southwest Electric Company, Oklahoma City, Okla.

[21] Appl. No.: 389,312

[22] Filed: Aug. 2, 1989

[51] Int. Cl.[5] .............................................. H02H 7/04
[52] U.S. Cl. ..................................... 361/35; 361/113; 361/270
[58] Field of Search .................. 361/58, 35, 110, 113, 361/270; 323/208, 356, 218

[56] References Cited

U.S. PATENT DOCUMENTS

| | | | |
|---|---|---|---|
| 1,320,980 | 11/1919 | Bowman . | |
| 1,905,044 | 4/1933 | Morrison . | |
| 2,462,751 | 2/1949 | Koehler | 318/229 |
| 2,791,646 | 5/1957 | Keroes | 179/171 |
| 2,811,699 | 10/1957 | Whittier | 336/69 |
| 2,812,488 | 11/1957 | Wright | 323/47 |
| 2,878,441 | 3/1959 | Rogers et al. | 323/44 |
| 2,990,524 | 6/1961 | O'Meara et al. | 333/24 |
| 3,284,669 | 11/1966 | Boyd | 317/13 |
| 3,286,153 | 11/1966 | Inose | 321/8 |
| 3,327,268 | 6/1967 | Rabus | 336/84 |
| 3,439,622 | 4/1969 | Welty et al. | 103/35 |
| 3,530,351 | 9/1970 | Grimwood | 318/229 |
| 3,675,175 | 7/1972 | Dutton | 336/70 |
| 3,678,428 | 7/1972 | Morris et al. | 336/84 |
| 3,842,186 | 10/1974 | Hall | 174/35 |
| 3,891,955 | 6/1975 | Horton, III | 336/205 |
| 4,160,224 | 7/1979 | Owen | 336/147 |
| 4,255,734 | 3/1981 | Owen | 336/147 |
| 4,433,284 | 2/1984 | Perkins | 323/361 |
| 4,524,341 | 6/1985 | Owen | 336/147 |

FOREIGN PATENT DOCUMENTS

| | | | |
|---|---|---|---|
| 278636 | 1/1952 | Switzerland . | |
| 1220247 | 1/1971 | United Kingdom | 361/270 |

Primary Examiner—Todd E. DeBoer
Attorney, Agent, or Firm—Laney, Dougherty, Hessin & Beavers

[57] ABSTRACT

A transformer comprising a primary winding and a secondary winding also includes a capacitor connected across at least a portion of the secondary winding within a housing of the transformer so that magnetically coupled voltage transients are filtered to prevent such transients from damaging a load connected to the secondary winding. An electrostatic shield is also included in the transformer to shield against capacitively coupled voltage transients. The capacitor also improves the power factor.

15 Claims, 2 Drawing Sheets

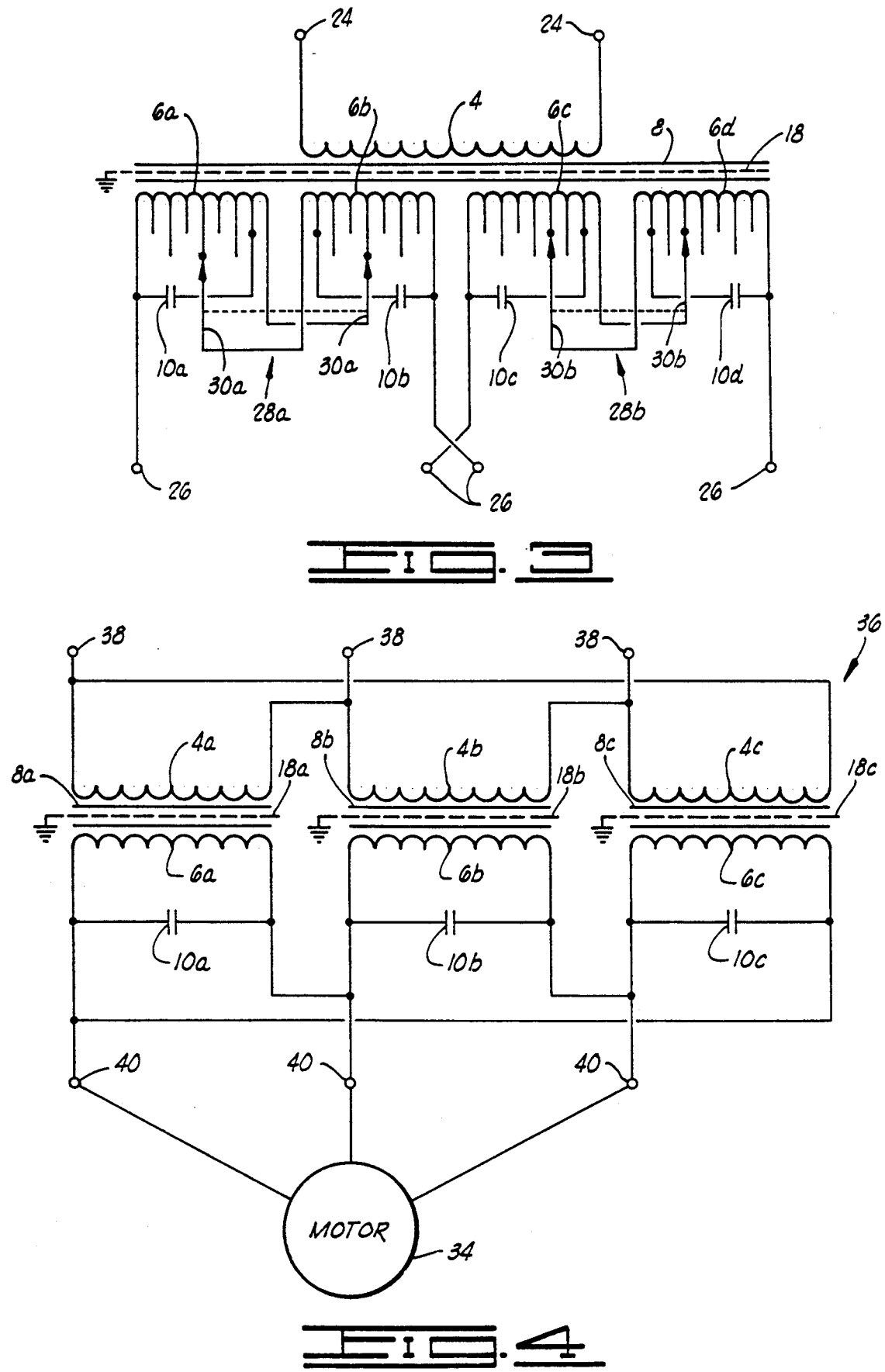

TRANSIENT-FILTERED TRANSFORMER

BACKGROUND OF THE INVENTION

This invention relates generally to transformers and more particularly, but not by way of limitation, to transformers in which capacitively and magnetically coupled voltage transients, such as voltage surges created by lightning striking power distribution lines, are filtered so that the transients do not damage a load powered through the transformer. The present invention also pertains to transformers which improve the power factor for an inductive load.

In the oil and gas industry, electric motors are used to drive submersible pumps which are located down in an oil or gas well. Such a motor is typically energized through a transformer connected at the well site to a conventional power distribution network.

One problem which has arisen in this system is that voltage transients in the power distribution network can be communicated through the transformer to the motor. When large enough or of long enough duration, these transients can damage the motor. This type of problem can arise such as when lightning strikes one or more of the primary distribution lines in the network or such as when some type of switching occurs in the network.

A typical transformer to which such transients can be conducted typically includes a primary winding connected to the power distribution network and a secondary winding connected to the motor (or other load). The primary and secondary windings are physically distinct, but they are typically spatially close to each other and they are inductively coupled. This permits transients received by the primary winding to be either capacitively coupled or magnetically coupled into the secondary winding through which they would then be applied to the load. Thus, to solve this transient problem, there is the need for a transformer that does not transmit, or at least reduces the transmission, into the secondary winding of either capacitively coupled transients or magnetically coupled transients.

Another shortcoming of the downhole submersible pump system, and more generally a shortcoming of at least induction motor systems, is that induction motors operate at less than unity power factor. Increasing the power factor would lower the primary system load and the transformer load. This could produce cost savings in otherwise needed transformer core, coil and cooling surface construction. Thus, there is also the need for a transformer which improves the power factor of an inductive load system such as one including an induction motor.

SUMMARY OF THE INVENTION

The present invention overcomes the above-noted and other shortcomings of the prior art by providing a novel and improved transformer which filters magnetically coupled, and more preferably both magnetically and capacitively coupled, transients and improves the power factor for an inductive load connected to the transformer.

An advantage of the present invention is that it can reduce or eliminate transient voltages which could otherwise be capacitively or magnetically induced into a secondary winding of a transformer by transients conducted to or otherwise occurring in the primary winding. An advantage of the present invention is also that it will improve the power factor of the current, both in the primary power distribution network and in the transformer windings, driving an inductive load.

The present invention provides a transformer, comprising: an electrically conductive first winding; an electrically conductive second winding inductively coupled to the first winding; and capacitance connected across less than the full length of the second winding. This preferred embodiment transformer further comprises electrostatic shield means for shielding against capacitive coupling between the first and second windings.

In a particular aspect of the present invention, there is provided an oil field pumping system electrically energized from a power distribution network which is susceptible to having voltage transients conducted therethrough such as in response to lightning strikes. This system comprises: three-phase electrical induction motor means for driving a submersible pump disposed in an oil well; and transformer means, connected to the power distribution network and the motor means, for providing a voltage transient-filtered three-phase voltage to the motor means, the transformer means including: three-phase primary winding means connected to the power distribution network, for receiving a three-phase voltage and voltage transients from the power distribution network; three-phase secondary winding means, inductively coupled to the primary winding means and connected to the motor means, for providing three-phase voltage induced therein to the motor means, the secondary winding means including three windings having inductance; and capacitance means, connected across at least a portion of the three windings, for adding capacitance to the inductance of the windings so that inductive-capacitive filters are defined for filtering voltage transients induced in the power distribution network, received by the primary winding means and coupled to the windings of the secondary winding means. In the preferred embodiment, the transformer means further includes electrostatic shield means for shielding voltage transients received by the primary winding means from being capacitively coupled from the primary winding means to the secondary winding means.

Therefore, from the foregoing, it is a general object to the present invention to provide a novel and improved transformer. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 3 is a schematic circuit diagram of a variable output voltage transformer of the present invention, wherein the transformer includes multiple secondary windings.

FIG. 4 is a schematic illustration of an oil field pumping system including a three-phase transformer and an induction motor.

DETAILED DESCRIPTION OF THE PREFERRED EMBODIMENTS

Figure 1:
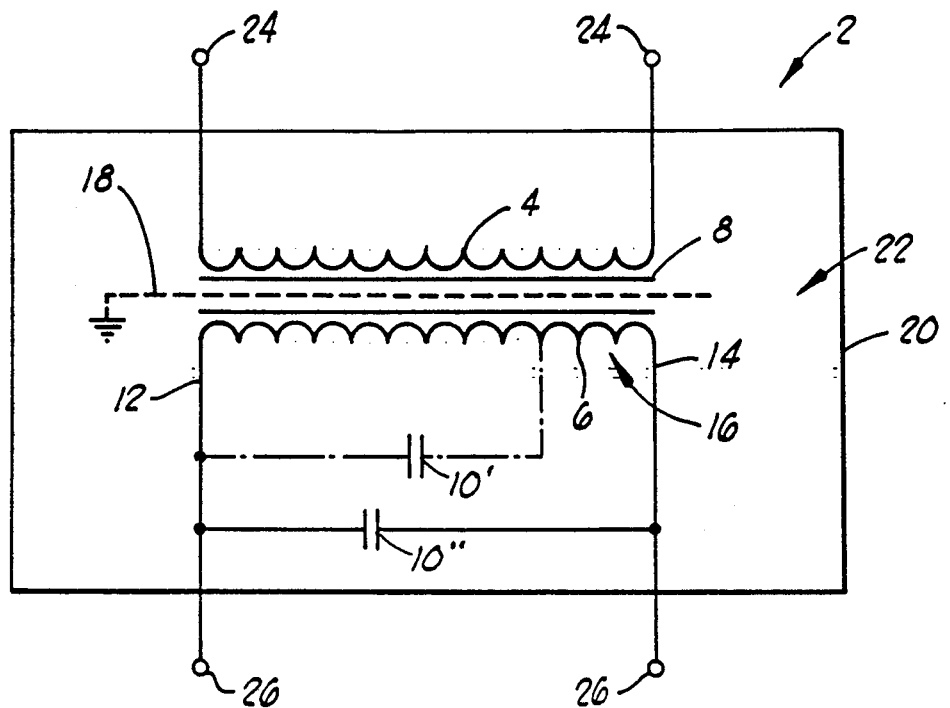
FIG. 1 is a schematic illustration of a transformer of the present invention, wherein a capacitor is shown in two alternative positions.
Figure 2:
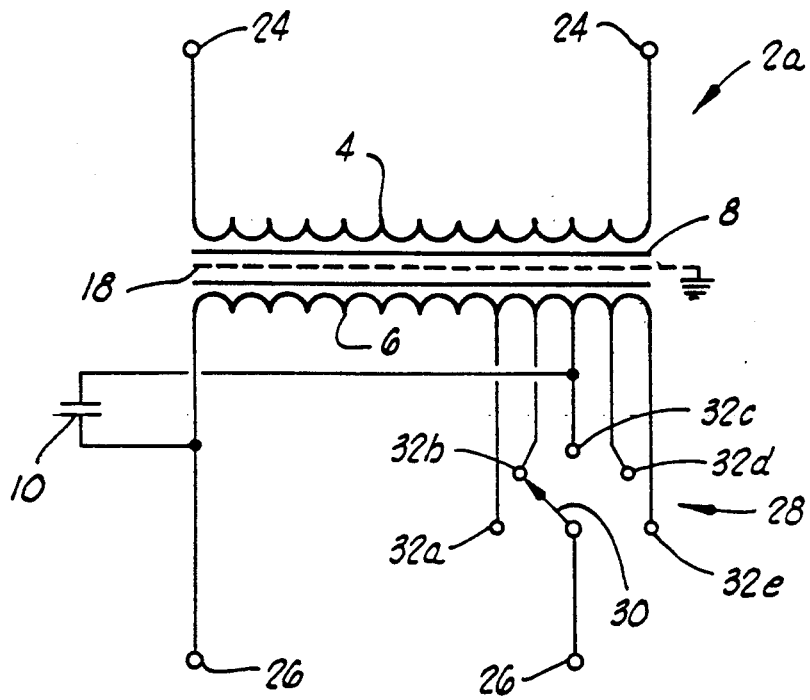
FIG. 2 is a schematic illustration of a variable output voltage transformer of the present invention, wherein a selectable output voltage can be provided.

A general embodiment of the present invention is disclosed in FIG. 1. Other embodiments are shown in FIGS. 2-4.

FIG. 1 schematically shows a transformer 2 which has an electrically conductive winding 4 inductively coupled with an electrically conductive winding 6. The inductive coupling of the embodiment shown in FIG. 1 is enhanced by the use of a metallic core 8 about which the electrical conductors defining the windings 4, 6 are wound in a manner as known in the art. Thus, the core 8 also provides support for the windings 4, 6. The winding 4 is the primary winding, and the winding 6 is the secondary winding. Within each of the windings, there are a plurality of turns or coils defining winding sections which can be tapped from or connected to as known in the art.

The transformer 2 has a selected or discrete capacitance connected across at least a portion of the winding 6. In the preferred embodiment of FIG. 1, this is implemented by a capacitor 10 shown in alternative positions wherein the capacitor 10' is connected anywhere between an end 12 of the winding 6 and any desired point short of the other end 14 of the winding 6. The capacitor 10" shows the alternative where the capacitor 10 is connected completely across the winding 6 in attachment to both ends 12, 14.

One function of the capacitor 10 is to correct the power factor of an inductive load, such as an induction motor, connected to the winding 6. The use of the capacitor 10 reduces the volt-ampere load in the transformer windings and in the primary power system to which the winding 4 is connected.

The capacitor 10 also combines with leakage reactance inherent in the transformer winding 6 to form an inductive-capacitive (L-C) filter which eliminates or reduces in the winding 6 the magnitude of high frequency voltage transients such as can be caused by lightning or switching occurring within the system to which the winding 4 of the transformer 2 is connected.

The capacitor 10 causes a fixed amount of capacitive volt-ampere load regardless of the output voltage provided from the winding 6. When the capacitor 10 is connected between less than the extremities of the winding 6, there remains a portion of the winding 6 in which high frequency transients can be induced without being completely filtered. Referring to FIG. 1, this could occur within the portion 16 between the end 14 and the nearest junction of the capacitor 10' with the winding 6. When the portion 16 is kept short enough, however, any shortcoming by permitting the resultant small amount of induction can be outweighed by the cost savings obtained through being able to use a smaller capacity capacitor 10 which needs to be rated only for the portion of the winding 6 across which it is connected.

The effectiveness of the power factor correction and high frequency transient filtering depends on the value of the capacitor 10 combined with the value of the leakage inductance of the transformer winding 6. A specific value would be known or could be readily calculated for specific transformer designs as known in the art.

The transformer 2 illustrated in FIG. 1 further includes an electrostatic shield 18 which shields against capacitive coupling between the windings 4, 6. Due to the typically close proximity of the windings 4, 6, voltage transients in the primary winding 4 can be capacitively coupled to the winding 6. The electrostatic shield 18 prevents or reduces this coupling. The effectiveness of the shielding depends on how the shield 18 is constructed as known in the art.

The transformer 2 shown in FIG. 1 further includes a housing 20 of a conventional type known in the art. The housing 20 has an interior chamber 22 in which the windings 4, 6 and the capacitor 10 are disposed. The capacitor 10 is fixed to the selected portion of the winding 6 inside the housing 20.

The transformer 2 includes input terminals 24 supported on the housing 20 and connected to the ends of the winding 4. The input terminals 24 connect the primary winding 4 to a power system, such as a power distribution network of a public utility.

The transformer 2 includes output terminals 26 supported on the housing 20 and connected to the winding 6. The load energized by the transformer 2 is connected to the output terminals 26.

A principal aspect of the present invention is the use of the capacitor 10 in the manner described, and more preferably its use in combination with the electrostatic shield; therefore, the particular configuration of the transformer windings is irrelevant. That is, the present invention can be adapted for use in different types of transformer winding configurations and connections. Non-limiting examples of such variations are shown in FIGS. 2-4, wherein elements corresponding to those shown in FIG. 1 are identified by the same reference numerals. Where there are multiple such elements, the same reference numeral plus letters are used for identification. The transformers shown in FIGS. 2-4 include housings, which are not shown for simplifying the drawings.

A transformer 2a shown in FIG. 2 includes the primary winding 4 and the secondary winding 6. The transformer 2a also includes the capacitor 10 and the electrostatic shield 18. Input terminals 24 are connected to the winding 4, and output terminals 26 are connected to the winding 6.

One of the output terminals 26 is connected to the winding 6 through a switch 28 which switchably connects a selected portion of the winding 6 to the respective output terminal 26. The switch 28 can be of a conventional type known in the art. The purpose of the switch 28 is to provide a selected output voltage across the terminals 26. This is accomplished in the FIG. 2 embodiment by moving a wiper 30 of the switch 28 into contact with different switch terminals 32a-32e, each of which is connected to a respective section or turn of the winding 6 in a manner as known in the art. The switch 28 is typically supported on the housing of the transformer.

Another version of a variable output voltage transformer is the embodiment shown in FIG. 3. The windings and switches of the embodiments shown in FIG. 3 are constructed in accordance with U.S. Pat. No. 4,160,224 to Owen, incorporated herein by reference. Non-limiting examples of other transformer winding designs are disclosed in U.S. Pat. No. 4,255,734 to Owen and U.S. Pat. No. 4,524,341 to Owen, both of which are also incorporated herein by reference.

The embodiment of the transformer shown in FIG. 3 includes multiple secondary windings 6 (four windings 6a, 6b, 6c, 6d are shown) and corresponding multiple capacitors 10a, 10b, 10c, 10d, one each of which is used for each respective secondary winding. That is, one capacitor 10 is used for each secondary winding 6, and the respective capacitor 10 is connected across at least a portion of the respective secondary winding 6.

In the FIG. 3 embodiment, the output terminals 26 are connected to respective ends of the secondary windings 6a, 6b, 6c, 6d so that variable output voltages can be provided through a combination of two or more of the terminals 26 and the settings of the switch wipers 30a, 30b.

The transformers shown in FIGS. 1-3 have been illustrated as single-phase transformers in that they have been illustrated with a single primary winding 4 connectable to receive a single phase of electricity. Shown in FIG. 4 is a three-phase configuration. The embodiment of FIG. 4 is particularly applicable to an oil field pumping system which includes a three-phase induction motor 34 energized by three phases of electrical current provided by a transformer 36. The transformer 36 can be a three-phase transformer or three single-phase transformers connected for three-phase operation. As illustrated in FIG. 4, each part of the transformer 36 adapted for a particular phase is of a construction similar to that shown generally in FIG. 1. Although FIG. 4 shows each capacitor 10 connected across the entire respective secondary winding 6, the capacitor 10 can be connected across a smaller portion of the respective winding similarly to the other embodiments previously described.

The primary windings 4a, 4b, 4c of the transformer 36 are connected as shown in FIG. 4 so that there are three terminals 38 by which the transformer 36 is connected to a power distribution network (not shown), such as a conventional three-phase system provided by a public utility. This network is susceptible to having voltage transients conducted through it, such as in response to lightning striking a power distribution line or switching which occurs within the network.

The secondary windings 6a, 6b, 6c of the FIG. 4 embodiment are connected to provide a three-phase output through terminals 40 which are connected to the three-phase electrical induction motor 34, which in the preferred embodiment is of a type for driving a submersible pump disposed in an oil well.

The transformer 36 provides a voltage transient-filtered three-phase voltage to the motor 34. As in the previously described embodiment, this is achieved through each capacitor 10 which adds capacitance to the inductance of the respective secondary winding 6 so that an L-C filter is defined for filtering voltage transients conducted in the power distribution network, received by the primary windings 4a, 4b, 4c and coupled to the secondary windings 6a, 6b, 6c. That is, transients generated in the power distribution network connected to the terminals 38 are conducted into the windings 4a, 4b, 4c where they are magnetically coupled by electromagnetic induction into the windings 6a, 6b, 6c and where they are filtered by the L-C filters which include the capacitors 10a, 10b, 10c.

Voltage transients which can be capacitively coupled from the windings 4a, 4b, 4c to the secondary windings 6a, 6b, 6c of the transformer 36 can be shielded by using the electrostatic shields 18a, 18b, 18c illustrated in FIG. 4.

Capacitors 10a, 10b, 10c provide a fixed amount of capacitive volt-ampere load to the power distribution network regardless of the magnitude of the induced three-phase voltage provided to the motor 34.

The transformer of the present invention eliminates or significantly reduces both capacitively coupled and magnetically coupled voltage transients. Because all transformers have leakage reactance, the inductive part of the L-C filter provided by the present invention is built into the transformer whether or not the capacitor 10 is added to complete the filter. Thus, half the filter against magnetically induced transients is "free".

Because induction motors operate at less than unity power factor and capacitors are often desirable to correct motor power factor, each capacitor 10 of the present invention also provides the advantage of correcting for the power factor whereby the primary system load and the transformer load are lowered. By properly sizing the capacitors 10, the motor power factor can be improved and the cost savings in the transformer core and coil construction and the cooling surface construction of the transformer can offset the cost of the capacitors.

Thus, the present invention is well adapted to carry out the objects and attain the ends and advantages mentioned above as well as those inherent therein. While preferred embodiments of the invention have been described for the purpose of this disclosure, changes in the construction and arrangement of parts can be made by those skilled in the art, which changes are encompassed within the spirit of this invention as defined by the appended claims.

What is claimed is:

1. A transient-filtered transformer, comprising:
    an electrically conductive primary winding;
    an electrically conductive secondary winding inductive by coupled to said primary winding for providing an output voltage, said secondary winding having leakage reactance; and
    capacitance connected directly across less than the full length of said secondary winding wherein said capacitance is rated for less than the full output of said secondary winding, said capacitance combining only with said leakage reactance so that an inductive-capacitive filter is formed for reducing high frequency voltage transients magnetically induced in said secondary winding.

2. A transformer as defined in claim 1, further comprising electrostatic shield means for shielding against capacitive coupling between said primary and secondary windings.

3. A transformer as defined in claim 1, further comprising a housing having an interior chamber in which said primary winding, said secondary winding and said capacitance are disposed.

4. A transformer as defined in claim 3, further comprising two output terminals disposed on the outside of said housing, one of said terminals connected to one end of said secondary winding and the other of said terminals switchably connected to a selected portion of said secondary winding spaced from said one end thereof.

5. A transformer, comprising:
    a housing;
    a core disposed in said housing;
    a primary winding supported on said core;
    a first secondary winding supported on said core, said first secondary winding having leakage reactance;
    a second secondary winding supported on said core, said second secondary winding having leakage reactance;
    switch means, supported on said housing, for switchably connecting selected sections of said first and second secondary windings to provide a selectable output voltage;

input terminals supported on said housing and connected to said primary winding;

output terminals supported on said housing and connected to said first and second secondary windings to output the selectable output voltage; and a first capacitor, connected across less than the full length of said first secondary winding inside said housing so that capacitance of said first capacitor and the leakage reactance of said first secondary winding provide an inductive-capacitive filter for filtering voltage transients magnetically induced in said first secondary winding.

6. A transformer as defined in claim 5, further comprising a second capacitor, connected across less than the full length of said second secondary winding inside said housing so that capacitance of said second capacitor and the leakage reactance of said second secondary winding provide an inductive-capacitive filter for filtering voltage transients magnetically induced in said second secondary winding.

7. A transformer as defined in claim 5, further comprising an electrostatic shield between said primary winding and said secondary windings.

8. An oil field pumping system, electrically energized from a power distribution network which is susceptible to having voltage transients conducted therethrough such as in response to lightning strikes, said system comprising:

three-phase electrical induction motor means for driving a submersible pump disposed in an oil well; and transformer means, connected to the power distribution network and said motor means, for providing a voltage transient-filtered three-phase voltage to said motor means, said transformer means including:

three-phase primary winding means connected to the power distribution network, for receiving a three-phase voltage and voltage transients from the power distribution network;

three-phase secondary winding means, inductively coupled to said primary winding means and connected to said motor means, for providing three-phase voltage induced therein to said motor means, said secondary winding means including three windings having inductance; and capacitance means, directly connected across less than the full length of said three windings, for adding capacitance to the inductance of said windings so that inductive-capacitive filters are defined for filtering voltage transients induced in the power distribution network, received by said primary winding means and coupled to said windings of said secondary winding means.

9. A pumping system as defined in claim 8, wherein said transformer means further includes electrostatic shield means for shielding voltage transients received by said primary winding means from being capacitively coupled from said primary winding means to said secondary winding means.

10. A pumping system as defined in claim 8, wherein said capacitance means includes:

a first capacitor, connected across a fixed portion of a first one of said three windings of said secondary winding means;

a second capacitor, connected across a fixed portion of a second one of said three windings of said secondary winding means; and a third capacitor, connected across a first portion of a third one of said three windings of said secondary winding means.

11. A pumping system as defined in claim 8, wherein said capacitance means provides a fixed amount of capacitive volt-ampere load to the power distribution network regardless of the magnitude of the induced three-phase voltage provided to said motor means.

12. A transient-filtered transformer, comprising:

primary winding means for receiving voltage and voltage transients; and filter means for providing a magnetically induced transient-filtered output in response to voltage and voltage transients received by said primary winding means, said filter means consisting essentially of:

secondary winding means inductively coupled to said primary winding means for providing leakage reactance; and capacitance means for providing capacitance, said capacitance means connected directly to only a portion of said secondary winding means so that capacitance of said capacitance means combines with the leakage reactance for filtering transients magnetically induced in said secondary winding means.

13. A transformer as defined in claim 12, further comprising electrostatic shield means for shielding against capacitive coupling between said primary winding means and said secondary winding means.

14. A transformer as defined in claim 13, further comprising a housing having an interior chamber in which all of said primary winding means, said filter means and said electrostatic shield means are disposed.

15. A transformer as defined in claim 12, wherein:

said secondary winding means includes a plurality of separate secondary windings inductively coupled to said primary winding means; and said capacitance means includes a plurality of separate capacitors, each of said capacitors connected directly across less than the full length of a respective one of said secondary windings.

* * * * *

UNITED STATES PATENT AND TRADEMARK OFFICE
CERTIFICATE OF CORRECTION

PATENT NO. : 5,005,100
DATED : April 2, 1991
INVENTOR(S) : Donald W. Owen

It is certified that error appears in the above-identified patent and that said Letters Patent is hereby corrected as shown below:

Column 6, lines 32-33, delete "inductive by" and substitute --inductively-- therefor.

Signed and Sealed this

Eighteenth Day of August, 1992

Attest:

DOUGLAS B. COMER

*Attesting Officer*   *Acting Commissioner of Patents and Trademarks*